United States Patent Office 3,366,613
Patented Jan. 30, 1968

3,366,613
MONOMERS AND POLYMERS OF N-(ACRYLOXY-ALKYL)ACYLAMIDES AND METHODS OF MAKING THEM
Everett J. Kelley, Moorestown, N.J., assignor to Rohm & Haas Company, Philadelphia, Pa., a corporation of Delaware
No Drawing. Original application Aug. 17, 1964, Ser. No. 390,229. Divided and this application Feb. 13, 1967, Ser. No. 615,362
15 Claims. (Cl. 260—89.5)

ABSTRACT OF THE DISCLOSURE

This invention is directed to new chemical compounds including novel polymerizable monomers and their polymerized products. The invention further relates to methods of producing the monomers and polymers.

The monomeric compounds of the present invention are of the general formula

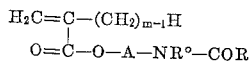

wherein $n$ is an integer having a value of 1 to 2,
A is an alkylene group having 1 to 4 carbon atoms,
$R°$ is selected from the group consisting of H, $CH_2OH$ and $CH_2OCH_3$ groups with the proviso that when A is a methylene group, $R°$ is H, and R is selected from the group consisting of hydrogen and alkyl groups having 1 to 4 carbon atoms.

The compounds of the above formula may be made by any one of several procedures. For example a methacrylic or acrylic acid halide or anhydride may be reacted with an alcohol of the formula

HOANR°COR wherein A, $R°$ and R are as defined above.

An alternative procedure for making the novel monomers in which A has at least 2 carbons is to react acetylene or methyl-acetylene with nickel or cobalt carbonyl, an acid and an alcohol of the formula HOANR°COR wherein A has at least 2 carbon atoms and R is as defined above.

The novel monomers may be polymerized or copolymerized in bulk, in solution, or in either an emulsion or suspension technique to produce various types of polymers.

The polymers of this invention are useful to provide coatings or films, thickening materials, warp sizes or finishes for textiles, leather, paper and plastic materials.

CROSS REFERENCES TO RELATED APPLICATIONS

This application is a division of U.S. application Ser. No. 390,229, filed Aug. 17, 1964, now abandoned.

This invention relates to new compounds including addition polymerizable monomers and the polymers thereof. It is particularly concerned with lower aliphatic acylamides substituted on the nitrogen atom with an acryloxyalkyl group. The invention is also concerned with methods of producing the monomers and addition polymers thereof.

The monomeric compounds of the present invention have the general formula

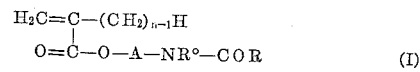

wherein $n$ is an integer having a value of 1 to 2,
A is an alkylene group having 1 to 4 carbon atoms,
$R°$ is selected from the group consisting of H, $CH_2OH$ and $CH_2OCH_3$ groups with the proviso that when A is a methylene group, $R°$ is H, and
R is selected from the group consisting of hydrogen and alkyl groups having 1 to 4 carbon atoms.

Preferred compounds are those of the formula

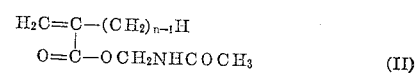

wherein $n$ is as defined above.

When it is not desired that polymers of the composition of Formula I be strongly susceptible to be cured to an insoluble and infusible state, $R°$ is preferably hydrogen, whereas if a readily curable or cross-linkable polymeric material is desired, $R°$ is preferably either methylol or methoxymethyl. Surprisingly, however, it appears that even in the polymers obtained from Formula I compounds in which $R°$ is a hydrogen atom, there is some tendency for the polymers to become more insoluble and less readily fusible on heating when A is a methylene group.

The compounds of Formula I may be made in any one of several ways. For example, the compounds in which $R°$ is H may be made by reacting an anhydride or a halide of an acid of the formula

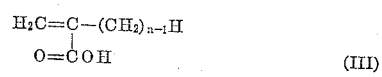

wherein $n$ is 1 or 2, with an alcohol of the formula

For example, methacrylic or acrylic acid anhydride may be mixed with a stoichiometrically equivalent amount of an alcohol of Formula IV and heated, such as to a temperature of 50° C. to 120° C. The reaction may be effected without using a separate solvent. However, an inert solvent may be included, if desired. Examples of solvents include benzene, toluene, xylenes, dioxane, and acetonitrile and, when A has more than 1 carbon atom, ketones, such as acetone and methyl isobutyl ketone. If a solvent is used, it may be left in admixture with the product or it may be removed by distillation.

The alcohols of Formula IV are generally known. Those in which the alkylene group A has only one carbon atom in a chain between the nitrogen and oxygen atoms may be obtained simply by reaction of the appropriate acyl amide of the formula $H_2NCOR$ (R being as hereinbefore defined) with an aldehyde, such as aqueous formaldehyde, or a source thereof, such as paraformaldehyde, at a pH of 3 to 10, preferably from about 7.5 to 10, at a temperature in the range from about room temperature to about 90° C., preferably 50–70° C. Those alcohols of Formula IV in which A is an alkylene group having 2 to 4 carbon atoms, at least two of which extend in a chain between the hydroxyl and the amido nitrogen are obtained by simply heating a carboxylic acid salt of an aminoalcohol of the formula $$HOANHR° \cdot HOOC—R \qquad (V)$$

and removing the water generated as a by-product as a result of the condensation of the acid and the aminoalcohol. Alternatively, these alcohols of Formula IV may be obtained by reaction of an acyl halide of the formula RCOX, R being defined hereinbefore and X being chlorine or bromine, with an aminoalcohol of the formula HOANHR° in which A is as defined hereinbefore. This reaction may be carried out in bulk or in an inert solvent or in a tertiary amine which is a solvent and may also serve as a hydrogen halide acceptor. The reaction medium is provided with a basic hydrogen halide acceptor which may be an organic tertiary amine such as pyridine, quinoline, triethylamine, etc., or it may be an inorganic base having appreciable solubility in the medium, such as an alkali metal hydroxide or carbonate. In general, the acyl halide is added gradually to the aminoalcohol containing a basic hydrogen halide acceptor. Excess aminoalcohol may be used to serve as an acceptor, but this is generally not preferred. The temperature of the reagents may be initially at room temperature or higher, but because of the exothermic nature of the reaction, cooling may be necessary to control the reaction and maintain the reaction mixture at a desired temperature in the range of room temperature to 95° C. The amount of hydrogen halide acceptor should be sufficient to provide the stoichiometric equivalent of the halide generated or released by the reaction, in other words, equivalent to the amount of alcohol or of acryl halide that is used. The temperature of the alcohol solution and of the acyl halide may be in the range from —20° C. up to 100° C. or so. Since the reaction is exothermic, the temperature may be controlled at any part of the temperature range by controlling the rate of addition of the acyl halide to the alcohol solution or by cooling the reaction mixture or by both expedients. After completion of the reaction which occurs practically as fast as the acyl halide is added, the solvent is stripped by reduced-pressure distillation, and the hydrohalide salt of the base acceptor is filtered off. The aminoalcohol product may then be washed with aqueous sodium carbonate or potassium carbonate in the presence of a water-insoluble solvent such as benzene or xylene. The aminoalcohol may be distilled before or after such washing.

An alternative procedure for making those compounds of Formula I in which A has at least 2 carbons is to use a modification of the procedure described in United States Patent 2,599,424. Thus acetylene or methyl-acetylene is treated with nickel carbonyl or cobalt carbonyl, with an acid, such as hydrochloric, phosphoric, or acetic acid, and with an alcohol of Formula IV above. The disclosure of the reaction conditions and procedural details in that patent is incorporated herein by reference. Such conditions and details apply generally as well to the reaction involving the alcohols of Formula IV herein.

The products of Formula I in which R° is methylol are obtained by reacting those products in which R° is H with formaldehyde or a suitable source thereof, such as paraformaldehyde, in an aqueous medium under conditions of slight to strong alkalinity, such as a pH of 7.5 to 11. The aqueous medium may contain a water-miscible solvent for the starting ester of Formula I. The temperature of reaction may be from about 30° C. to about 100° C., a range of about 50° to 80° C. being preferred. The proportion of formaldehyde may range from about 1 to 4 moles, thereby converting R° into a methylol group. The methylolated product thereby obtained may be recovered by distillation of aqueous solvent and excess formaldehyde.

The products of Formula I in which R° is a methoxymethyl group may be made from the methylolated products by adding methanol to the methylolated reaction product and rendering the mixture acid, i.e. to a pH of about 2 to 6.5, preferably about 2 to 4, and heating the mixture for a period of at least a fourth of an hour to an hour or so at a temperature of 30° to 100° C., preferably 50° to 80° C. Alternatively, the initial step of reaction with formaldehyde may be carried out in a solvent medium consisting of or comprising aqueous methanol. The reaction in that event may be carried out at a pH of about 7.5 to 11 at first and then completed at a pH of about 2 to 6.5, an alkaline material, such as caustic soda or an amine being used to adjust the pH at first and a suitable acidic material being added during the later stage of reaction.

Generally the products of Formula I are appreciably soluble in water, but those in which R° is a methylol or methoxymethyl group and A and R are small, e.g. 1 to 2 carbon atoms, are more soluble in water than most of the others.

The compounds of Formula I are generally soluble in such organic solvents as lower aliphatic alcohols, such as methanol, ethanol, and isopropanol; esters such as ethyl acetate, butyl acetate, amyl acetate, and 2-butoxyethyl acetate; dimethylformamide, diethylformamide and acetonitrile.

As a chemical intermediate, the monomeric compounds of the present invention are adapted to react at the double bond with various compounds including alcohols, mercaptans, primary or secondary amines, nitroalkanes, malonates, acetoacetates, sodium bisulfite, and so on. The addition of long chain amines, or mercaptans, such as dodecylamine or mercaptan, provides compounds which are highly useful as water-proofing, softening and lubricating agents for textiles of all types and especially of cellulosic type including rayon and cotton, for leather and for paper.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although some of the compounds of Formula I have generally appreciable solubility in water, all of the compounds of Formula I may be polymerized with or without other monomers by an emulsion technique in which the comonomers and any excess of the compound of Formula I over the amount that is soluble in the water are emulsified by non-ionic, cationic or anionic emulsifiers or suitable mixtures thereof. When persulfates are used as initiators as described hereinafter, stable latices are obtainable even without including an emulsifier initially in the polymerization system.

The polymerization is effected with the aid of a free radical initiator or catalyst, such as an organic or inorganic peroxide catalyst, peroxy catalyst, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl, peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds that may be copolymerized with the compound of Formula I include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylcarbazole, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis-(vinyloxyethyl)urea, or vinyloxyethyl acrylate or methacrylate, insoluble interpolymers result.

The homopolymers of the N-methylol or N-methoxymethyl compounds of Formula I which are water-soluble are useful as sizes for paper, textiles and particularly as warp sizes. When introduced into paper pulps, they provide increased wet strength in the final dry paper containing them. For this purpose, there may be used from about 1% to 7% of a polymer of one of the compounds of Formula I on the dry fiber weight of the paper. They are useful as curable thickeners for various aqueous coating, adhesive, and film-forming compositions. These homopolymers may be used in admixture with other materials, such as starch, gelatin, or plasticizers therefore to provide coatings or films, thickening materials, warp sizes or the like. These homopolymers mixed with other film-forming materials, such as vinyl and acrylic resins, may be pigmented or dyed to provide heat-cured decorative coatings on substrates, such as textile, leather, paper, wood, or on metal or glass surfaces. These homopolymers may be combined with aminoplast resin-forming condensation products, such as those of urea-formaldehyde or triazineformaldehyde condensates including melamine-formaldehyde. The inclusion of these homopolymers of the present invention serves to increase the toughness of the product and the water-resistance thereof when used in amounts of about 5% to 15%, based on the weight of the aminoplast condensate.

Copolymers may be prepared from about 0.2 to 99.8% by weight of at least one compound of Formula I with from 99.8 to 0.2% of at least one other ethylenically unsaturated monomer having a group of the formula $H_2C=C<$. Normally, the preferred copolymers are those formed exclusively of monoethylenically unsaturated copolymerizable molecules which give rise to thermoplastic, linear polymers. However, for some purposes, a small amount, e.g. from 0.1 to 25% by weight, based on the total weight of the monomeric material, of a polyethylenically unsaturated material, such as divinylbenzene, ethylene glycol dimethacrylate, butylene glycol dimethacrylate, or diallyl phthalate, may be included to increase the molecular size of the copolymer or to form a cross-linked product. Thus, up to 20% of such a polyethylenically unsaturated material may be mixed with methyl methacrylate (e.g. 75%) and a compound of Formula I (e.g. 5%) to form a molding composition which is mixed with a catalyst such as benzoyl peroxide and polymerized in a suitable mold by heating in conventional fashion. Preferred copolymers are those of copolymerizable monoethylenically unsaturated molecules having a group of the formula $H_2C=C<$ comprising about 1 to 10% by weight, based on the total monomer weight, of at least one compound of the Formula I.

Copolymers of the compound of Formula I, which by virtue of adequate content of water-soluble monomers whether of those of Formula I or of others, such as acrylic acid, acrylamide, or the like, have similar utilities to the extent that they are water-soluble as warp sizes, wet strength resins in paper, and thickeners. However, copolymers containing from about 0.5 to 20% by weight or more of the compounds of Formula I with various comonomers are adapted to provide valuable coating materials which may be pigmented or not, and may contain plasticizers or not, and in the case of emulsion copolymers, they are adapted to provide valuable water-base paints.

Examples of plasticizers that may be used are dibutyl phthalate, butyl benzyl phthalate, triphenyl phosphate, di-n-hexyl adipate, methyl abietate, ethyl phthalyl ethyl glycolate, tributyl phosphate, diisooctyl phthalate, and glycerol monoricinoleate. Examples of pigments include carbon black, titanium dioxide, ultramarine blue, lead chromate, copper phthalocyanine blues and greens, zinc chromate, zinc oxide, clays, calcium carbonate, lead carbonate, and barium sulfate, iron oxides, toluidines, Prussian Blue, Chrome Yellow, Para Red Toners, Lithol Red, Cadmium Red, and chromium oxide.

Copolymers containing at least 1% and preferably from 5 to 20% by weight of a compound of Formula I with ethyl acrylate, butyl acrylate, or the like, are useful to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 240° F. to 350° F. for a period of one-half to fifteen minutes. The copolymers containing 1.2 to 5% or even up to 10 or 20% by weight of units derived from a monomer of Formula I are also excellent binders for non-woven fabrics of all types of material and synthetic fibers or filaments made by the air-deposition, carding, or garnetting of the fibers or filaments, such as those of rayon, wool, cellulose acetate and other esters and ethers, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 240° F. to 350° F. for a period of one-half to thirty minutes, to cure the polymer thereon. Similar aqueous dispersions made by the emulsion copolymerization of a monomer of Formula I with acrylic esters and especially butyl acrylate or ethyl acrylate are useful, with or without pigment, for the primary coating of leather. In this connection, the heterocyclic group apparently exerts some chemical bonding action with the structure of the leather so as to provide good adhesion. Copolymers with acrylonitrile, especially those containing from 75 to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75 to 90% acrylonitrile, such as copolymers thereof with vinyl chloride, vinyl acetate or the like, serve to modify the dyeing properties of fibers and films formed therefrom.

The copolymers may also be blended with other resins, such as the aminoplast resin-forming condensation products mentioned above, vinyl or acrylic resins, such as polystyrene, polyvinyl chloride, polymethyl methacrylate, alkyds, cellulose esters and others, to form valuable coating compositions.

The copolymerization of small amounts (½ to 5%) of a monomer of Formula I with methyl methacrylate in the normal casting procedure for making shaped polymeric articles serves to increase the lower limit of temperature at which distortion occurs and also to reduce the susceptibility to solvents. In one preferred manner of operating, the casting may be done under conditions which bring into play substantially only the addition copolymerization reactivity so that the initially obtained casting is still thermoplastic; this casting may then be formed into the ultimately desired shape by heating under conditions which cross-link the copolymer to infusible condition through the reactive groups of the units derived from the compound of Formula I.

To illustrate the utility in blending with other resins an aqueous dispersion of a copolymer of about 1 to 5% by weight of a monomer of Formula I with 0 to 15% by weight of methyl methacrylate and the balance to make 100% of ethyl acrylate or butyl acrylate or a mixture thereof may be formed by emulsion polymerization, a polyvinyl chloride powder (obtained by suspension polymerization) may be mixed into the aqueous dispersion along with a pigment such as titanium dioxide or the like and then the resulting mixture may be sheeted on a two-roll or a three-roll mill immediately or after having its water content reduced by working in a hot blender. The proportion of pigment may range from 5% to 150% by weight of the dispersed copolymer and the amount of dispersed copolymer may range from 5 to 100% by weight of polyvinyl chloride powder. Instead of polyvinyl chloride, there may be used copolymers of vinyl chloride with vinyl acetate and acrylonitrile or polystyrene or copolymers of styrene and acrylonitrile. The films obtained by rolling such mixtures or by extrusion thereof are tough yet flexible and homogeneous. Films obtained in this fashion but with little or no pigment are also useful as laminating films. That is, they can be inserted between thin sheets of wood to form plywood by application of pressure and heat to the assembled layers. Instead of laminating sheets of wood, the films may be used to laminate wood to metal, plastics to metal, metal to metal, or plastics to plastics. The laminated products are characterized by good resistance to separation either in dry or moist condition apparently as the result of the presence in the laminating film of a polymer containing the monomer of the Formula I herein.

Water-soluble polymers containing units of a compound of Formula I may be used as dressings, sizes, or finishes for textiles, leather, paper, and plastic materials that, because of their water-solubility, can be readily removed as in securing a woven fabric after wearing, or can be converted to a permanent water-insoluble, organic-solvent-resistant and heat-resistant coating, finish or the like or any of the substrates mentioned by a baking operation at a temperature between 240° F. and 350° F. for a half to thirty-minute period or so. For example, acrylic or methacrylic acid may be copolymerized with ½ to 20% by weight of a compound of Formula I with or without one or more other comonomers which need not be hydrophilic, such as an ester of one of the acids, like ethyl acrylate, methyl methacrylate, and so on, and the copolymer neutralized with ammonium, sodium, potassium, or lithium hydroxide to provide a neutral or alkaline copolymer salt adapted to be used as a thickener, especially for aqueous systems, such as are used for textile printing or for loom sizes, which salt after drying on the textile may be insolubilized and rendered permanent by baking at 240° to 350° F.

The copolymers containing even small amounts of a monomer of Formula I herein, such as 0.5 to 10% by weight based on the copolymer weight, shown marked adhesion when applied as coatings or laminating layers to numerous substrates, such as bare steel, aluminum, wood, masonry, concrete, alkyd resins, and so on. It appears that, to attain such adhesiveness, it is essential to avoid excessive size in the A and R in Formula I. When these groups are made appreciably larger than the 4-carbon atoms upper limit of size designated herein, the resulting compound loses its adhesion capacity, apparently by virtue of the predominating influence of the large hydrocarbon group or groups reducing the polarity of the branches which project out from the main C-to-C atom "backbone" chain of the polymer. For these reasons, the compounds of Formula II in which A is $CH_2$ and R is $CH_3$ are preferred.

To assist those skilled in the art to practice the present invention, the following modes of operation are suggested by way of illustration, parts and percentages being by weight unless otherwise specifically noted.

N-(methacryloxymethyl)acetamide (1) This monomer is prepared by adding methacrylic anhydride (236 parts; 1.53 moles) over a half-hour period to a mixture, at a temperature of 40–50° C., of N-methylolacetamide (136 parts: 1.53 moles) and 0.77 part of phenothiazine to inhibit polymerization and toluene (272 parts) as solvent. The mixture is then refluxed for two hours and distilled in vacuo to recover the desired N-(methacryloxymethyl)acetamide, boiling range 96° C./0.5 mm. Hg–101° C./0.75 mm. Hg, $N_D^{20}$ 1.4700.

Analysis.—Bromine number (m. eq. Br/g. sample): Calculated, 12.7. Found, 12.8. Percent nitrogen calculated: 8.91. Found: 8.45.

(2) The monomer obtained in (1) above is homopolymerized by refluxing in benzene solution with 0.5% (wt. percent on the monomer) azobisiobutyronitrile.

(3) A solution copolymer composition is prepared in the following manner. Toluene (67 parts) is charged to a glass polymerization flask equipped with a stirrer, reflux condenser, thermometer, and an addition funnel. The toluene is stirred and heated to 110° C. A monomer-catalyst solution consisting of the following materials:

| | Parts |
|---|---|
| n-Butyl methacrylate | 45 |
| Methyl methacrylate | 50 |
| N-methacryloxymethylacetamide | 5 |
| Azobisisobutyronitrile | 0.5 | is then added to the flask at an even rate over a period of two hours with continued stirring and heating (at 110° C.–115° C.). A catalyst solution of 0.5 part azobisisobutyronitrile in 18 parts toluene is then added to the batch in three equal portions; two, three, and four hours after the addition of the monomer mixture. The mixture is heated an additional three hours, cooled, and diluted with 58 parts toluene. The final solution contains 40% solids.

(4) Panels of degreased cold-rolled steel, glass, aluminum, and steel primed with a commercial alkyd primer are coated with the copolymer solution obtained in (3) above, dried at room temperature, and baked at 150° C. for about 30 minutes. Well-adhered tough coatings are obtained. The coating shows especially good adhesion on steel both in a dried state and even after soaking in water.

(5) An emulsion copolymer composition is prepared in the following manner. To a 1-liter, 3-neck round-bottom flask fitted with a reflux condenser thermometer, agitator and nitrogen inlet is charged water (580 gms.), t-octylphenoxypoly(40)ethoxyethanol (17.1 gms. of 70% solution), ethyl acrylate (110 gms.), methyl methacrylate (80 gms.), and N-methacryloxymethyl acetamide (10 gms.) in that order. The system is swept with nitrogen and the temperature adjusted to 15° C. with an ice bath. Polymerization is initiated by the addition of freshly prepared solutions of ammonium persulfate (0.2 gm. in 10 mls. $H_2O$), sodium hydrosulfite (0.2 gm. in 10 mls. $H_2O$), and ferrous sulfate (2.0 mls. of 0.1% aqueous solution of $FeSO_4 \cdot 7H_2O$) in the sequence just described. The polymerization generates heat which carries the batch temperature to 60° C. in 27 minutes. When the batch temperature drops 10° C. (air cooling only), an ice bath is applied and the dispersion cooled to room temperature. Dispersion solids following polymerization is approximately 25%.

(6) The latex obtained in (5) is coated on alkyd, wood, and steel, and after air-drying, it produces well-adhered protective films on these surfaces. If desired, the coated substrates may be dried at elevated temperatures such as up to 80–90° C. In addition, the dried coatings may be baked at even higher temperature such as up to 400° C. for a period of a minute to 15 minutes.

N-(acryloxymethyl)acetamide (7) This monomer is prepared in a manner similar to that of (1) above by treating N-methylolacetamide (89 parts; 1.0 mole) with acrylic anhydride (126 parts; 1.0 mole) in benzene (250 parts) as solvent. Para-hydroxydiphenylamine (1 part) is used as polymerization inhibitor. The anhydride is added to the mixture of the other constituents over a one-half hour period at 40–50° C. The mixture is then refluxed for two hours and distilled in vacuo to recover N-(acryloxymethyl)acetamide as a clear, water-white liquid.

(8) The monomer obtained in (6) is homopolymerized by refluxing in benzene solution with 0.5 wt. percent (on the monomer) azobisisobutyronitrile.

(9) A solution copolymer is prepared by the procedure of (3) above using as the monomers 85 parts methyl methacrylate, 10 parts ethyl acrylate, and 5 parts of N-(acryloxymethyl)acetamide. The product obtained may be used, with or without a pigment, to coat substrates of various metals, e.g. cold-rolled steel, aluminum, and copper or plastics, especially alkyds, including alkyd-primed steel panels to provide adherent protective coatings thereon.

(10) An emulsion copolymer is prepared by the procedure of (5) above using as the monomers 120 parts ethyl acrylate, 250 parts vinyl acetate, and 8 parts N-(acryloxymethyl)acetamide. A white water-base paint made from the dispersion in conventional fashion using titanium dioxide pigment adheres well to wood and masonry surfaces.

N-(2-methacryloxyethyl)formamide

(11) This monomer is prepared by treating N-(2-hydroxyethyl)formamide (49 parts; 0.5 mole) with methacrylyl chloride (53 parts; 0.5 mole) in acetone (200 parts) as solvent using triethylamine (51 parts; 0.5 mole) as hydrogen chloride acceptor and para-hydroxydiphenylamine (about 1 part) as polymerization inhibitor. The acid chloride is added to the mixture of hydroxyamide, amine, acetone, and inhibitor at 35–45° C. with stirring and occasional cooling over an hour period. The mixture is then heated an additional hour at 65° C. and cooled to 15° C. when it is held for 15 minutes and filtered to remove the triethylamine hydrochloride. The salt is washed with a small amount of cold acetone (50 parts) and the combined filtrates vacuum stripped. The residue is then distilled in the presence of a small additional amount of inhibitor to recover the desired product as 125–135° C./1 mm. Hg. Refractionation through a short column gives a better quality product, B.P. 127° C./1 mm. Hg, $N_D^{20}$ 1.4782.

*Analysis.*—Bromine number (m. eq. Br/g. sample): Calcd., 12.7. Found, 12.3. Percent nitrogen calculated: 8.9. Found: 9.2.

Infrared data established the presence of methacrylic ester along with little to no formate ester which indicated the product was not the isomeric N-(2-formyloxyethyl)methacrylamide.

N-(2-methacryloxyethyl)acetamide

(12) This monomer is prepared by treating N-(2-hydroxyethyl)acetamide (309 parts; 3 moles) with methacrylyl chloride (315 parts; 3 moles) in acetone (600 parts) as solvent using triethylamine (303 parts; 3 moles) as basic agent for removal of the generated hydrogen chloride and N,N - diphenyl - paraphenylenediamine (2 parts) as polymerization inhibitor. The acid chloride is added in a dropwise manner to the mixture of hydroxyamide, amine, acetone, and inhibitor, at 40–50° C., with stirring and cooling during the period of about an hour. The batch is then warmed to 50–60° C. for an additional hour, cooled, and filtered. The insolubles (triethylamine hydrochloride) are washed with acetone (300 parts) and the acetone wash combined with the first filtrate. The combined filtrate is vacuum stripped of aceton, redissolved in an equal volume of benzene, and washed with aqueous potassium carbonate solution. The oil layer is then dried over anhydrous potassium carbonate and distilled in vacuo, with stirring, through a short-pass still head. Additional N,N'-diphenylparaphenylenediamine and hydroquinone are added as polymerization inhibitors. The product distills at 130–140° C./1mm. Hg, $N_D^{20}$ 1.4705.

*Analysis.*—Bromine number (m. eq. Br/g. sample): Calcd., 11.7. Found, 11.4. Percent nitrogen calculated: 8.18. Found: 8.2.

(13) A mixture is prepared from 7.5 parts of lauryl methacrylate, 0.5 part of toluene, and 0.04 part of a 50% butanol solution of diisopropylbenzene hydroperoxide. A portion of 2.4 parts of this mixture and 0.04 part of butanol solution of 5% diisobutylphenoxyethoxyethyl benzyl dimethylammonium chloride is charged to a reaction vessel swept with nitrogen and heated to 110° C. Twenty minutes are allowed for the exothermic reaction to subside. The remaining monomer mixture is then charged during the next 100 minutes maintaining the temperature at 110° C. During the interval between 2 hours and 2.25 hours, a mixture of 1.5 parts lauryl methacrylate, 1.0 part N-(2-methacryloxyethyl)acetamide, 0.5 part of toluene, and 0.025 part of the diisopropylbenzene hydroperoxide solution (50%) is added. Until the end of the fourth hour, the batch temperature is held at 110° C. It is then held at 113° C. for the rest of the copolymerization cycle for a total of 7 hours. A 50% solution of diisopropylbenzene hydroperoxide is added as follows: at 2.8 hours, 0.005 part; at 4 hours, 0.0076 part; and at 4.67 hours, 5.33 hours, and 6 hours each, 0.005 part. Each time initiator is added, 0.5 part toluene and diisobutylphenoxyethoxyethyl benzyl dimethylammonium chloride, amounting to one-tenth the quantity of hydroperoxide, is also added. An additional 16 parts of toluene is added in increments over the last 4.75 hours of the polymerization period to maintain fluidity. At the end of the polymerization period (7 hours) the solution analyzes about 30% solids.

The polymer solution is added to enough petroleum oil to produce an oil concentrate of 35% solids when all toluene and small amounts of other impurities are removed by vacuum stripping for an hour at 135° C./10 mm. Hg.

(14) When 100 parts of the 35% copolymer solution of (13) is added to 1685 parts lubricating oil containing 0.4% asphaltenes, the latter is well dispersed.

(15) Solution copolymers of *N-(2-methacryloxyethyl) formamide* are prepared for automotive finishes. Two, 3.5 and 5.0 mole percent of this monomer are copolymerized with 98, 96.5 and 95 mole percent methyl methacrylate by the procedure of (3) above.

Coatings of the resulting compositions applied to panels of steel primed with a commercial alkyd primer in the manner described in (4) hereinabove show good adhesion.

(16) Solution copolymers are prepared from N-(2-methacryloxyethyl)acetamide using 3.0 and 5.0 mole percent of this monomer with 97 and mole percent respectively of methyl methacrylate by the procedure of (3) above.

Coatings of the resulting compositions applied to panels of steel primed with a commercial alkyd primer in the manner described in (4) hereinabove show good adhesion.

I claim:

1. As a composition of matter, a compound of the formula

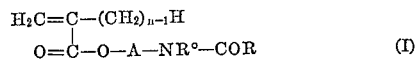    (I)

wherein
 $n$ is an integer having a value of 1 to 2,
 A is an alkylene group having 1 to 4 carbon atoms,
 R° is selected from the group consisting of H, $CH_2OH$ and $CH_2OCH_3$ groups with the proviso that when A is a methylene group, R° is H, and
 R is selected from the group consisting of hydrogen and alkyl groups having 1 to 4 carbon atoms.

2. As a composition of matter, an addition polymer of a compound of the formula of claim 1.

3. As a composition of matter, an addition copolymer of at least one compound of the formula of claim 1 with at least one other copolymerizable ethylenically unsaturated compound having a group of the formula

4. As a composition of matter, an addition copolymer of about 0.2 to 99.8% by weight of at least one compound of the formula of claim 1 with at least one other copolymerizable ethylenically unsaturated compound having a group of the formula

5. As a composition of matter, a compound according to claim 1 of the formula

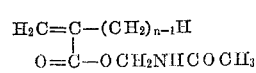

wherein $n$ is an integer having a value of 1 to 2.

6. As a composition of matter, an addition polymer of a compound according to claim 1 of the formula

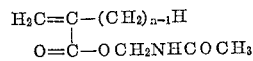

wherein $n$ is an integer having a value of 1 to 2.

7. As a composition of matter, an addition copolymer of about 0.2 to 99.8% by weight of at least one compound of the formula of claim 5 with at least one other copolymerizable ethylenically unsaturated compound having a group of the formula

8. As a composition of matter, a compound according to claim 1 of the formula

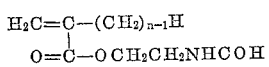

wherein $n$ is an integer having a value of 1 to 2.

9. As a composition of matter, an addition polymer of a compound according to claim 1 of the formula

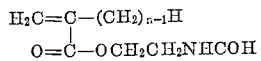

wherein $n$ is an integer having a value of 1 to 2.

10. As a composition of matter, an addition copolymer of about 0.2 to 99.8% by weight of at least one compound of the formula of claim 8, with at least one other copolymerizable, ethylenically unsaturated compound having a group of the formula

11. As a composition of matter, a compound according to claim 1 of the formula

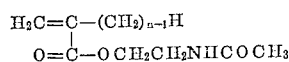

wherein $n$ is an integer having a value of 1 to 2.

12. As a composition of matter, an addition polymer of a compound according to claim 1 of the formula

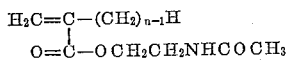

wherein $n$ is an integer having a value of 1 to 2.

13. As a composition of matter, an addition copolymer of about 0.2 to 99.8% by weight of at least one compound of the formula of claim 11 with at least one other copolymerizable ethylenically unsaturated compound having a group of the formula

14. A method which comprises mixing an anhydride of an acid of the formula

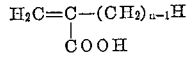

wherein $n$ is an integer having a value of 1 to 2 with an approximately stoichiometric equivalent amount of an alcohol of the formula

wherein
 A is an alkylene group having 1 to 4 carbon atoms, and
 R is an alkyl group having 1 to 4 carbon atoms, and heating the mixture to a temperature from 50° C. to 120° C., thereby producing a compound of the formula

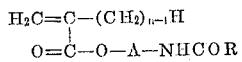

wherein $n$, A, and R are as defined herein.

15. A method of producing an ester of an acid of the formula

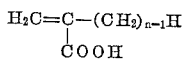

by reacting an alcohol with a compound selected from the group consisting of acetylene and methyl-acetylene in the presence of a compound selected from the group consisting of nickel carbonyl and cobalt carbonyl and an acid characterized in that the alcohol so reacted is an alcohol of the formula HOANHCOR wherein A is an alkylene group having 1 to 4 carbon atoms and R is an alkyl group having 1 to 4 carbon atoms, $n$ being an integer having a value of 1 to 2.

No references cited.

JOSEPH L. SCHOFER, *Primary Examiner.*

H. WONG, *Assistant Examiner.*